US009177221B2

(12) United States Patent
Nagy

(10) Patent No.: US 9,177,221 B2
(45) Date of Patent: Nov. 3, 2015

(54) PARKING LOT

(75) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 594 days.

(21) Appl. No.: 13/412,394

(22) Filed: Mar. 5, 2012

(65) Prior Publication Data

US 2012/0236149 A1    Sep. 20, 2012

(30) Foreign Application Priority Data

Mar. 17, 2011   (EP) .................................... 11450037

(51) Int. Cl.
| H04N 7/18 | (2006.01) |
| G06K 9/32 | (2006.01) |
| E04H 6/42 | (2006.01) |
| G08G 1/14 | (2006.01) |
| B60L 11/18 | (2006.01) |

(52) U.S. Cl.
CPC ........... *G06K 9/3258* (2013.01); *B60L 11/1827* (2013.01); *B60L 11/1846* (2013.01); *E04H 6/426* (2013.01); *G08G 1/142* (2013.01); *G08G 1/146* (2013.01); *B60L 2240/72* (2013.01)

(58) Field of Classification Search
CPC ............. E04H 6/426; B60Q 1/48; B60T 3/00; E01F 13/065; E01F 9/053
USPC ....................................................... 348/148
See application file for complete search history.

(56) References Cited

U.S. PATENT DOCUMENTS

| 6,107,942 | A | 8/2000 | Yoo et al. | |
| 7,104,447 | B1 * | 9/2006 | Lopez et al. | 235/384 |
| 7,688,225 | B1 * | 3/2010 | Haynes et al. | 340/932.2 |
| 2004/0068433 | A1 * | 4/2004 | Chatterjee et al. | 705/13 |
| 2005/0002544 | A1 * | 1/2005 | Winter et al. | 382/104 |
| 2006/0179671 | A1 | 8/2006 | Ghatak | |
| 2008/0195257 | A1 * | 8/2008 | Rauch | 701/1 |
| 2010/0191585 | A1 * | 7/2010 | Smith | 705/13 |

FOREIGN PATENT DOCUMENTS

| DE | 10 2007 052 819 A1 | 5/2009 |
| EP | 1986 172 A1 | 10/2008 |
| GB | 2 247 554 A | 3/1992 |

OTHER PUBLICATIONS

Patent Examination Report No. 1 received for Australian Patent Application No. 2012200537, mailed on Oct. 8, 2013, 6 pages.

(Continued)

*Primary Examiner* — Dave Czekaj
*Assistant Examiner* — Berteau Joisil
(74) *Attorney, Agent, or Firm* — Fiala & Weaver P.L.L.C.

(57) ABSTRACT

A parking lot with a plurality of parking spaces for vehicles that have OCR-readable license numbers and onboard units with radio IDs that can be read out via radio signals. The parking lot including a central computer for storing parking space reservations, a vehicle license number and an assigned radio ID, a radio beacon for the parking spaces for reading out the radio ID of an entering vehicle via radio and signaling the radio ID to the central computer, and at least one camera unit for each parking space for reading the license number of a vehicle and correspondingly signaling the license number to the central computer. The central computer checks whether for a radio ID signaled to the central computer the vehicle license number is subsequently signaled by the camera unit of this parking space, and to log instances in which this is not the case.

20 Claims, 1 Drawing Sheet

(56) References Cited

OTHER PUBLICATIONS

Rotenberg et al., "License Plate Recognition: Vision-Based Parking Management", Parking Today, available online at <http://www.parkingtoday.com/articledetails.php?id=615>, retrieved on Oct. 22, 2013, Article Abstract from Apr. 2008, 1 page.

Extended European Search Report for corresponding European Patent Application No. 11 450 037.4, dated Oct. 27, 2011, 9pp.

\* cited by examiner

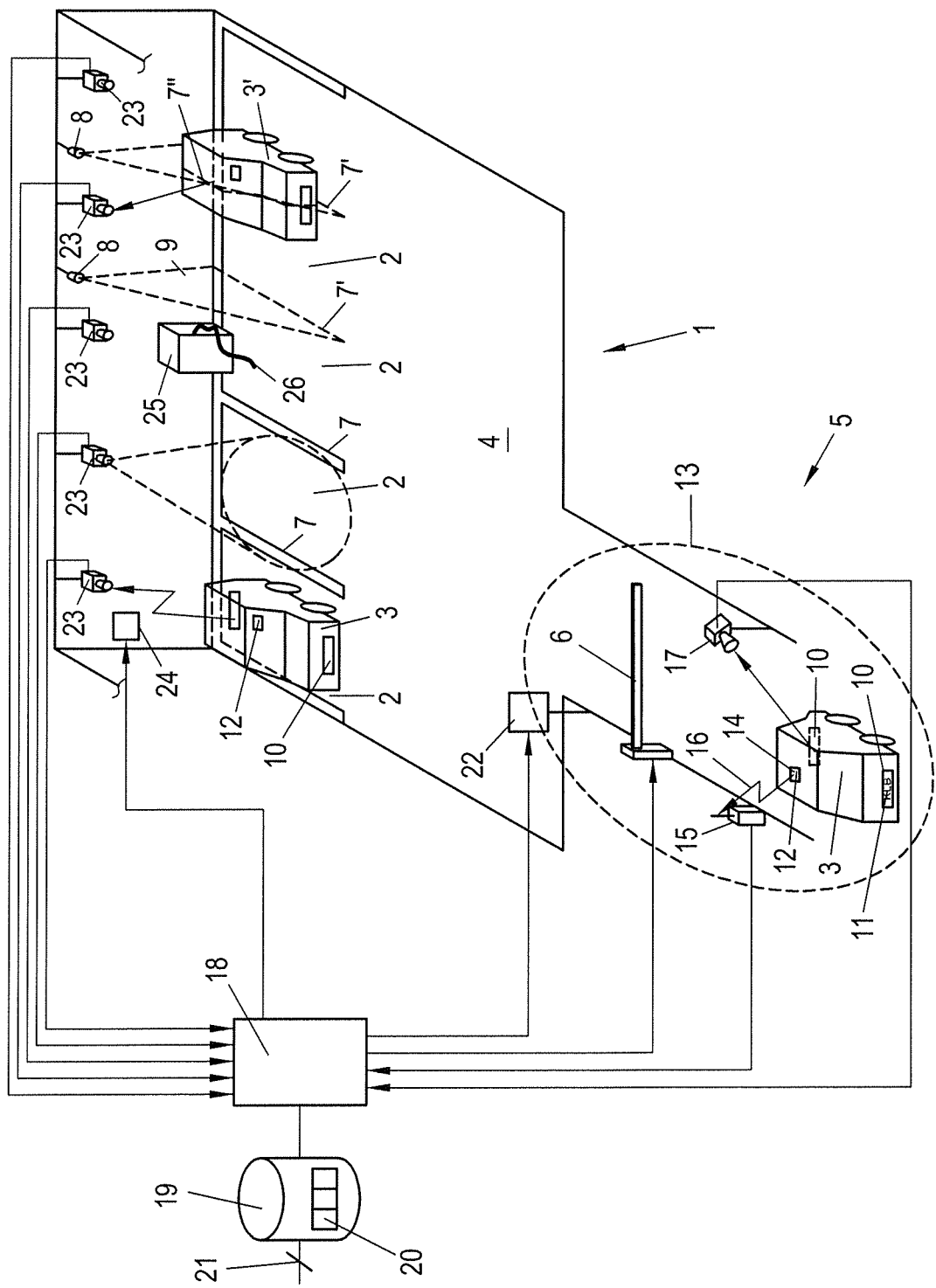

PARKING LOT

CROSS-REFERENCE TO RELATED APPLICATION(S)

This application claims priority to European Patent Application No. 11 450 037.4, filed on Mar. 17, 2011, the contents of which are hereby expressly incorporated by reference.

FIELD OF THE INVENTION

The present invention pertains to a parking lot with a plurality of parking spaces for vehicles that have license plates with OCR-readable license numbers and onboard units with radio IDs that can be read out via a radio.

BACKGROUND

Parking lot management systems are known in several variations. EP 1 986 172 discloses a general reservation system in which identification data is read out via radio when entering and exiting. However, this publication does not provide for the reservation of specific parking spaces and also does not disclose any measures for increasing the functional reliability and the protection against manipulation or any measures for monitoring purposes. Publication US 2004/0068433 discloses a parking lot management and reservation system with a central computer, into which users can enter parking space reservations, e.g., via the Internet, and a camera at the entrance for reading the license numbers of the entering vehicles by means of optical character recognition (OCR) to open a barrier for vehicles that have parking space reservations. Parking attendants patrol the parking lot with mobile handheld devices that are connected to the central computer via radio and serve for randomly reading the license numbers of the parked vehicles by means of OCR to take action against parking violators. Although systems of this type reach a high degree of automation, they still require manual control processes and are also susceptible to incorrectly read, or even forged, license numbers.

SUMMARY

In some embodiments, the present invention is a parking lot with a plurality of parking spaces for vehicles that have license plates with OCR-readable license numbers and onboard units with radio IDs that can be read out via radio. The parking lot includes: a central computer for storing parking space reservations each comprising an indication of a parking space, a vehicle license number and an assigned radio ID; a radio beacon for the parking spaces that is positioned at an entrance of the parking lot for reading out the radio ID of an entering vehicle and signaling the radio ID to the central computer; and at least one camera unit for each parking space for reading the license number of a vehicle parked therein by OCR and signaling the license number to the central computer. The central computer is configured to check whether for a given radio ID signaled to the central computer, the vehicle license number assigned thereto in a stored parking space reservation is subsequently signaled by the camera unit of said parking space, and to log instances in which said vehicle license number is not subsequently signaled by said camera unit.

That is, in some embodiments, the present invention is directed to the novel approach of equipping each individual parking space with an OCR camera unit for reading license numbers in connection with a radio beacon that is able to read out radio onboard units (OBUs) of the vehicles at the entrance. The identification of an entering vehicle takes place via radio, and therefore in a way that is forgery-proof and immune to interference, while the localization and validation of the vehicle in the parking space is once again realized with high-locating-reliability means of optical recognition (OCR). The combination of centralized radio ID and decentralized optical localization and validation allows a fully automated and highly secure operation of the parking lot that is also immune to interference. In this case, it is also possible to make available all known technical functionalities such as advance reservations via the Internet, automatic billing of the parking fees, automatic actions against parking violations, and statistical evaluations.

In some embodiments of the invention, an additional camera mounted at the entrance for reading the license number of an entering vehicle by OCR and correspondingly signaling the central computer is mounted at the entrance of a parking lot. A central computer is designed for checking whether a signaled radio ID and a vehicle license number signaled by the additional camera unit are assigned to one another in a parking space reservation, The central computer is also configured for logging instances in which this is not the case. This makes it possible to realize an additional validation stage at the entrance that further increases the protection against misuse of the parking lot.

To quickly inform the user, a display panel controlled by the central computer may furthermore be mounted at the entrance of the parking lot and the central computer may be configured for displaying on the display panel the parking space that is assigned to a signaled radio ID in a parking space reservation system.

At this point, it should be noted that the optical identification of license numbers in parking garages by means of OCR for relocating the parking space of a vehicle is generally known, e.g., from publication DE 10 2007 052 819, wherein the vehicle is not associated with the user until the final checkout process by inputting the license number at the automated pay station, such that this technology is not suitable for a reservation system.

BRIEF DESCRIPTION OF THE DRAWINGS

The invention is described in greater detail below with reference to an exemplary embodiment that is illustrated in the attached drawings.

FIG. 1 shows a schematic perspective view of an exemplary parking lot including exemplary electrical components that are illustrated in the form of a block diagram, according to some embodiments of the present invention.

DETAILED DESCRIPTION

The present invention is directed to a parking lot with a plurality of parking spaces for vehicles that have license plates with OCR-readable license numbers and onboard units with radio IDs that can be read out via radio. The parking lot according to the invention is suitable for interacting with any type of onboard unit that can be read out via radio signals such as, e.g., transponders carried by vehicles, RFID chips, etc. The radio beacon for reading out the radio ID of an entering vehicle may be a dedicated short-range communication (DSRC) radio beacon for reading out onboard units of a DSRC road toll system via radio. Due to their limited communication range, which can be restricted to the region of the parking lot entrance, DSRC radio beacons provide an increased immunity to interference and a definite allocation and localization of the onboard unit currently being read out.

The inventive parking lot solution is particularly suitable for equipping the parking spaces with electric vehicle charging stations ("power service stations") that are controlled by the central computer, which can unlock the charging station for charging a vehicle after successfully checking the vehicle license number signaled by the camera unit of the respective parking space. Due to the inventive combination of radio ID and OCR localization of the vehicle, a highly reliable validation of the vehicle located in a parking space is achieved such that the improper use of charging stations such as, e.g., the charging station of an adjacent (unreserved) parking space, is precluded.

The parking space reservation system may also contain charging parameters that are specific to the respective vehicle and can be sent to the charging station of the parking space by the central computer. Such charging parameters may, for example, be input into the central computer during the reservation of the parking space by the user or be read out from the onboard unit by the radio beacon and automatically added to the parking space reservation. Accordingly, charging parameters that are specific to the vehicle are correspondingly stored in the onboard unit such that they can be read out via radio.

This feature is particularly advantageous if the user did not reserve a parking space in advance, but rather directly makes an "ad-hoc" parking space reservation at the entrance, e.g., to immediately utilize a currently available parking space with a charging station. All charging parameters that are specific to the vehicle are stored locally in the onboard unit and therefore are immediately available to the charging station. This eliminates the need to query any user data from remote superordinate centers, e.g., via data lines, since such queries would be disadvantageous for an ad-hoc parking space reservation due to the fact that they usually require a longer period of time.

The utilization of a camera unit for the localization of a vehicle in a parking space equipped with a charging station by means of OCR also provides the option of simultaneously using the camera unit for monitoring the charging process, in which the camera unit records a thermal image of the vehicle during the charging process in order to trigger an alarm when a maximum temperature is exceeded. This makes it possible to prevent dangerous overheating caused, e.g., by defective vehicle batteries or faulty charging processes.

In some embodiments of the present invention, the camera units used at the parking spaces can be used not only for the localization and validation of the parking vehicles by OCR, but also, for optical control of the vehicles' correct parking position. Accordingly, at least one parking space may be provided with a surface marking that can be detected by its camera unit, wherein the camera unit detects and logs instances in which the surface marking is covered by a vehicle parked thereon, in cooperation with the central computer.

In some embodiments, at least two camera units per parking space are provided that jointly monitor the surface marking thereof, e.g., to cover and monitor all areas around a vehicle.

The surface markings may include simple color marks on the ground. According to some embodiments of the invention, the color marks are projected on the ground by at least one lighting unit. For example, the lighting unit may project an entire light pattern on the ground such that it can specify different sizes of parking spaces, e.g., depending on the occupancy level of the parking lot. The projected light pattern also makes it possible to realize a monitoring of the parking position in accordance with the light-section procedure projecting a light fan onto the ground and the camera unit(s) lying outside the light fan. This makes it possible to recognize surface-marking violations by distortion of the projected intersecting lines of the light fan.

FIG. 1 shows a parking lot 1 with a plurality of parking spaces 2 for a vehicle 3. The parking spaces 2 can be reached from an adjacent traffic area 4 through a common entrance 5. The entrance 5 may be provided with a barrier 6, however, this barrier is optional. The individual parking spaces 2 are respectively partitioned or separated from one another by surface markings 7, 7'. For example, the surface markings 7 may be applied on the ground with paint or, like the surface markings 7', projected on the ground in the form of light markings by one or more lighting units 8, e.g., in the form of light fans 9, discussed in more detail later.

Each of the vehicles 3 that use the parking lot 1 has one or more license plates 10 on which its license number 11 is printed in an optically readable fashion. The vehicles 3 furthermore carry onboard units (OBUs) 12 that can be queried via radio signals and includes, for example, onboard units that are used in electronic road toll systems and respectively have a distinct radio ID 14 (OBU-ID) that can be read out via radio signals. The radio ID 14 identifies the onboard unit 12 and may also directly correspond to or contain the license number 11 of the vehicle. The onboard units 12 may include separate devices or be part of the electronic system of the vehicles 3.

In addition, a radio beacon 15 is arranged at the entrance 5 in order to read out (arrow 16) the radio ID 14 of the onboard unit 12 of an entering vehicle 3. The radio beacon 15 may have a radio coverage area 13 that is restricted to the region of the entrance 5. The radio beacon 15 may also have several distributed radio units, e.g., for an entrance 5 with several lanes, to which a separate radio unit with a radio coverage area restricted to this lane is respectively assigned.

The radio communication 16 for reading out the radio ID 14 may take place in accordance with the DSRC standard, wherein the radio beacon 15 includes a DSRC radio beacon and the onboard unit 12 includes a DSRC OBU. Alternatively, the radio communication 16 could take place in accordance with other short-range communication standards such as, e.g., wireless local area network (WLAN), wireless access in a vehicle environment (WAVE), Bluetooth®, radio frequency identification (RFID), near field communication (NFC), etc.

A camera unit 17 for optically reading the license number 11 of an entering vehicle 3 is mounted at the entrance 5. The radio beacon 15 and the camera unit 17 of the entrance 5 are connected to a central computer 18 of the parking lot 1. The radio beacon 15 signals a radio ID 14 queried by the radio beacon via radio to the central computer 18 and the camera unit 17 also signals a vehicle license number 11 read by the camera unit to the central computer 18.

In some embodiments, the vehicle license number 11 read by the camera unit 17 is converted into an alphanumerical value by OCR and signaled to the central computer 18. The OCR evaluation algorithm may also be executed on the central computer 18. In this case, the corresponding OCR components of the central computer 18 are also considered to be components of the camera unit 17, if they are not directly implemented therein.

If a barrier 6 is provided, it can also be actuated by the central computer 18.

The central computer 18 features a database 19 with parking space reservations 20 that respectively contain a number or a location of a parking space 2, as well as a vehicle license number 11 and a radio ID 14 of a vehicle 3 assigned to this license number. For example, the parking space reservations 20 can be entered into the database 19 by the user in advance, e.g., via a web interface 21 of the central computer 18 or its database 19.

When a vehicle 3 enters the parking lot, the radio beacon 15 signals the radio ID 14 of the vehicle 3 to the central computer 18 and the central computer determines the parking space reservation 20 in the database 19 that is associated with the radio ID 14. If the (optional) camera unit 17 is provided, this camera unit can also signal the vehicle license number 11 read by OCR to the central computer 18 and the central computer can cross-check the vehicle license number 11 with the vehicle license number stored in the parking space reservation 20.

After a parking space reservation 20 has been validated for the signaled radio ID 14 and the vehicle license number 11 optionally has been successfully cross-checked, the central computer 18 actuates the barrier 6 such that it opens, if such a barrier is provided. Furthermore, the central computer 18 can display the parking space reservation 20 to the user of the vehicle 3 on a display panel 22 at the entrance 5, for example, to provide the user of the vehicle with visual information concerning the number or the location of the parking space 2. One or more display panels 22 may also be arranged at the parking spaces 2 in order to direct the driver to the respectively reserved parking space.

Instead of the described validation of an "advance" parking space reservation, it is possible to directly make an "ad-hoc" parking space reservation at the entrance 5. In this case, the radio beacon 15 signals the radio ID 14 queried via radio to the central computer 18 and the camera unit 17 signals the vehicle license number 11 read by means of OCR to the central computer. The central computer then determines an available parking space 2 and assigns the radio ID 14, the vehicle license number 11 and the number of the parking space 2 to one another, in a parking space reservation 20 in the database 19.

If the radio ID 14 directly corresponds to or contains the vehicle license number 11, a parking space reservation 20 can be generated based on the radio ID 14 signaled to the central computer 18. In this case, the (optional) camera unit 17 can be used for cross-checking the vehicle license number 11 indicated in the radio ID 14 with the vehicle license number 11 in the central computer 18 that was read by means of OCR.

The user subsequently drives the vehicle 3 to the respectively reserved parking space 2. Each parking space 2 is equipped with its own camera unit 23 that reads the license number 11 of the vehicle parking in the respective parking space (or entering the parking space, which is considered to also be encompassed by the term "parking" in this context) by means of OCR. The camera units 23 of the parking spaces 2 respectively signal the vehicle license numbers 11 read by means of OCR to the central computer 18. The OCR algorithms may also be executed on the central computer 18 since it is also to be encompassed by the term "OCR camera units" 23.

After the radio beacon 15 signals a radio ID 14, the central computer 18 is programmed for checking whether the camera unit 23 of the parking space 2 indicated in the parking space reservation 20 together with this radio ID 14 subsequently also signals the vehicle license number 11 indicated in this parking space reservation 20, for example, within a predetermined period of time. If this is the case, the respective car is properly parked and the parking fees can also be correspondingly calculated, e.g., by the central computer 18. If this is not the case, the vehicle 3 obviously has reached an incorrect parking space 2 and this fact is at least logged by the central computer 18. Optionally, corresponding alarms, warning messages, or warning announcements can be output with loudspeakers or displayed on information panels 24 of the parking spaces 2.

The readout 16 of the radio ID 14 by radio beacon 15 therefore ensures identification of an entering vehicle 3. The identification is immune to interference, and the OCR camera units 23 of the parking spaces 2 ensure a precise localization and validation of the parked vehicle 3.

The camera units 23 may further be used for checking the correct parking position or parking state of the vehicles 3 in the parking spaces 2, wherein in that they optically monitor and evaluate the surface markings 7, 7'. A vehicle 3 that protrudes over a painted surface marking 7 at least partially covers this marking can be detected in the camera image of the camera unit(s) 23. A vehicle 3' that protrudes beyond a surface marking 7' projected by a light fan 9 distorts the line of light projected on the ground by the light fan 9 into a "profiled" line of light 7" on the vehicle 3'. This can be detected in the camera image of a camera unit 23 that does not lie in the same plane as the light fan 9 ("light-section procedure").

One or more parking spaces 2 may further be equipped with charging stations 25 ("power service stations") for electrically charging the parking vehicles 3 via a charging cable 26. In this case, the central computer 18 may be programmed for releasing the charging station 25 in order to charge the vehicle 3 after a successful radio ID and OCR localization and validation of the vehicle 3 in the parking space 2, i.e., if the radio ID 14, the vehicle license number 11 and the parking space number are assigned to one another in the parking space reservation 20.

The radio beacon 15 may also read charging parameters that are specific to the vehicle such as the charging current, the charging characteristics, etc., from the onboard unit 12 via radio signals and signal these charging parameters to the central computer 18, which in turn transmits the parameters to the corresponding charging station 25. In some embodiments, charging parameters that are specific to the vehicle may also be fed into the database 19, e.g., via the web interface 21, and added to the parking space reservations 20. If the user already is a registered customer of the parking lot, the data may have already been stored in the database 19 of the central computer 18 when the OBU was issued to the user.

In parking spaces 2 with charging stations 25, the camera units 23 assigned to the parking spaces 2 can also be used for monitoring the charging process of the vehicle 3, particularly for detecting overheating or fires. For this purpose, the camera units 23 may optically detect, e.g., a development of excessive light (fire) or additionally record a thermal image of the parked vehicle 3 in order to trigger an alarm and/or immediately shut off the charging station 25 when a maximum temperature is exceeded in the thermal image.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A parking lot with a plurality of parking spaces for vehicles that have license plates with optical character recognition (OCR)-readable license numbers and onboard units with radio IDs that can be read out via radio, comprising:

a central computer configured to store parking space reservations each comprising an indication of a parking space, a vehicle license number and an assigned radio ID; and a common radio beacon for the parking spaces that is positioned at an entrance of the parking lot and configured to read out the radio ID of an entering vehicle and signal the radio ID to the central computer;

wherein each parking space is individually equipped with at least one camera unit, the at least one camera unit being configured to read the license number of a vehicle parked on the parking space by OCR and signal the license number to the central computer, wherein the central computer is configured to check whether for a given radio ID signaled to the central computer, the vehicle license number assigned thereto in a stored parking space reservation is subsequently signaled by the camera unit of said parking space, and to log instances in which said vehicle license number is not subsequently signaled by said camera unit.

2. The parking lot according to claim 1, further comprising an additional camera unit mounted at the entrance and being configured to read the license number of the entering vehicle by OCR and signal the license number to the central computer, wherein the central computer is further configured to check whether a signaled radio ID and a vehicle license number signaled by the additional camera unit are assigned to one another in a parking space reservation, and to log instances in which said assigned radio ID and said vehicle license number are not signaled to one another in said parking space reservation.

3. The parking lot according to claim 1, further comprising a display panel mounted at the entrance and controlled by the central computer, wherein the central computer is configured to display, the parking space that is assigned in a parking space reservation to a radio ID signaled to the central computer, on the display panel.

4. The parking lot according to claim 1, wherein the common radio beacon is a dedicated short-range communication (DSRC) radio beacon for reading out onboard units of a DSRC road toll system via radio.

5. The parking lot according to claim 1, wherein at least one parking space is equipped with an electric vehicle charging station controlled by the central computer, and wherein the central computer is further configured to unlock the charging station for charging the vehicle after successfully checking the vehicle license number signaled by the camera unit of said at least one parking space.

6. The parking lot according to claim 5, wherein the parking space reservation for said parking space contains charging parameters that are specific to the vehicle and transmitted to the charging station by the central computer.

7. The parking lot according to claim 6, wherein the charging parameters specific to the vehicle are read from the onboard unit by the common radio beacon and added to the parking space reservation.

8. The parking lot according to claim 5, wherein the camera unit of said parking space is configured to record a thermal image of the vehicle during the charging process to trigger an alarm, if a temperature of the vehicle exceeds a predetermined value.

9. The parking lot according to claim 1, wherein at least one parking space is provided with a surface marking that separates the at least one parking space from other parking spaces from one another and can be monitored by its camera unit, and wherein the camera unit, in cooperation with the central computer, detects and logs instances in which the surface marking is covered by a vehicle parking thereon.

10. The parking lot according to claim 9, wherein at least two camera units are provided per parking space to jointly monitor the surface marking of the parking space.

11. The parking lot according to claim 9, wherein the surface marking is projected onto the ground by at least one lighting unit.

12. The parking lot according to claim 11, wherein the lighting unit projects a light fan onto the ground and at least one of the camera units lies outside the light fan.

13. A method for checking reservations of a parking lot with a plurality of parking spaces for vehicles that have license plates with OCR-readable license numbers and onboard units with radio IDs that can be read out via radio, comprising:

storing a parking space reservation comprising an indication of a parking space, a vehicle license number and an assigned radio ID in a central computer, reading out the radio ID of an entering vehicle via radio by a common radio beacon for the plurality of parking spaces that is positioned at an entrance of the parking lot and signaling the radio ID to the central computer, and for a parking space of the plurality of parking spaces, OCR reading the vehicle license number of a vehicle parked on the parking space of the plurality of parking spaces by at least one stationarily mounted camera unit and signaling the license number to the central computer, and checking in the central computer whether for a radio ID signaled to the central computer the vehicle license number assigned to the radio ID in the stored parking space reservation is subsequently signaled by the camera unit of the parking space, and logging instances in which said vehicle license number is not subsequently signaled by said camera unit.

14. The method according to claim 13 for a parking lot of which at least one parking space is equipped with an electric vehicle charging station that is controlled by the central computer, wherein the central computer unlocks the charging station for charging the vehicle after successfully checking the vehicle license number signaled by the camera unit of this parking space.

15. The method according to claim 14, wherein the parking space reservation for said parking space contains charging parameters that are specific to the vehicle and transmitted to the charging station by the central computer.

16. The method according to claim 15, wherein the charging parameters specific to the vehicle are read from the onboard unit by the common radio beacon and added to the parking space reservation.

17. The method according to claim 14, wherein the camera unit of said parking space also records a thermal image of the vehicle during the charging process in order to trigger an alarm if a maximum temperature is exceeded.

18. The method according to claim 13 for a parking lot at the entrance of which an additional camera unit for OCR reading the license number of an entering vehicle and signaling the license number to the central computer is mounted, wherein the central computer checks whether a signaled radio ID and a vehicle license number signaled by the additional camera unit are assigned to one another in the parking space reservation, and logs instances in which this is not the case.

19. The method according to claim 13, wherein the central computer displays, on a display panel mounted at the entrance, the parking space that is assigned in the parking space reservation to a radio ID signaled to the central computer.

20. The method according to claim 14, wherein the central computer displays, on a display panel mounted at the entrance, the parking space that is assigned in the parking space reservation to a radio ID signaled to the central computer.

\* \* \* \* \*